(12) United States Patent
Siegl et al.

(10) Patent No.: US 11,557,154 B2
(45) Date of Patent: Jan. 17, 2023

(54) SYSTEM AND METHOD FOR VERIFICATION AND/OR RECONCILIATION OF TOLLING OR OTHER ELECTRONIC TRANSACTIONS, SUCH AS PURCHASE TRANSACTIONS

(71) Applicant: Kapsch TrafficCom AG, Vienna (AT)

(72) Inventors: Thomas Siegl, Vienna (AT); Gerald König, Haslau (AT)

(73) Assignee: Kapsch TrafficCom AG, Vienna (AT)

( * ) Notice: Subject to any disclaimer, the term of this patent is extended or adjusted under 35 U.S.C. 154(b) by 1189 days.

(21) Appl. No.: 15/631,877

(22) Filed: Jun. 23, 2017

(65) Prior Publication Data

US 2018/0374279 A1  Dec. 27, 2018

(51) Int. Cl.
*G07B 15/06* (2011.01)
*G06Q 20/32* (2012.01)
(Continued)

(52) U.S. Cl.
CPC .............. *G07B 15/06* (2013.01); *G01S 19/13* (2013.01); *G06Q 20/145* (2013.01);
(Continued)

(58) Field of Classification Search
CPC ...... G07B 15/06; G07B 15/063; G07B 15/02; G06Q 20/3224; G06Q 50/30;
(Continued)

(56) References Cited

U.S. PATENT DOCUMENTS 6,109,525 A   8/2000  Blomqvist et al.
10,121,289 B1 * 11/2018  Gravelle .............. G07B 15/063
(Continued)

FOREIGN PATENT DOCUMENTS

EP   1042738 A1   10/2000
EP   1975884 A1   10/2008
(Continued)

OTHER PUBLICATIONS

Business Editors & High-Tech Writers International Bridge, Tunnel & Turnpike Association 70th,Annual Meeting. (Sep. 23, 2002). TransCore unveils forte toll solutions, single suite of toll software products that combine wide range of services. Business Wire (Year: 2002) Retrieved from https://dialog.proquest.com/professional/docview/444959004?accountid=131444 (Year: 2002).*

(Continued)

*Primary Examiner* — Resha Desai
*Assistant Examiner* — Michelle E Carey
(74) *Attorney, Agent, or Firm* — Wiggin and Dana LLP; Pierre R. Yanney

(57) ABSTRACT

System and method for verification and/or reconciliation of electronic transactions, such as for example, toll transactions or other purchase transactions. A vehicle utilizes an onboard communication device, such as a mobile phone, to locate virtual tolling points using GPS location, and then to communicate to an electronic tolling service provider that the vehicle has passed through the virtual tolling point. In addition, roadside equipment may be used to capture photo/video of the vehicle as it passes the virtual tolling point. The GPS-based toll transaction data is used in conjunction with the photo-based toll transaction data to verify a proper toll transaction, and optionally to reconcile between missing and/or inconsistent GPS-based and photo-based toll transaction data.

8 Claims, 15 Drawing Sheets

(51) Int. Cl.
*G07B 15/02* (2011.01)
*G08G 1/052* (2006.01)
*G08G 1/017* (2006.01)
*G06V 20/00* (2022.01)
*G01S 19/13* (2010.01)
*G06Q 20/14* (2012.01)
*G06Q 50/30* (2012.01)

(52) U.S. Cl.
CPC ......... *G06Q 20/3224* (2013.01); *G06Q 50/30* (2013.01); *G06V 20/00* (2022.01); *G07B 15/063* (2013.01); *G08G 1/017* (2013.01); *G08G 1/0175* (2013.01); *G08G 1/052* (2013.01); *G07B 15/02* (2013.01)

(58) Field of Classification Search
CPC ...... G06Q 20/145; G06V 20/00; G01S 19/13; G08G 1/017; G08G 1/0175; G08G 1/052
See application file for complete search history.

(56) References Cited

U.S. PATENT DOCUMENTS

| | | | |
|---|---|---|---|
| 2002/0054210 A1* | 5/2002 | Glier | H04N 7/183 348/149 |
| 2012/0215594 A1 | 8/2012 | Gravelle | |
| 2013/0018705 A1* | 1/2013 | Heath | G08G 1/14 705/13 |
| 2013/0127643 A1 | 5/2013 | Malarky | |
| 2014/0074762 A1* | 3/2014 | Campbell | G06Q 40/02 706/46 |
| 2015/0154578 A1* | 6/2015 | Aggarwal | G07B 15/063 705/13 |
| 2016/0055466 A1* | 2/2016 | Du | G06Q 20/145 705/13 |
| 2016/0171787 A1* | 6/2016 | Yohalashet | G07B 15/063 705/13 |
| 2018/0276842 A1* | 9/2018 | Seaman | G06Q 10/20 |
| 2018/0293442 A1* | 10/2018 | Fridental | G06F 16/5854 |

FOREIGN PATENT DOCUMENTS

| | | | |
|---|---|---|---|
| EP | 2690601 A2 | 1/2014 | |
| WO | WO99/33027 A1 | 7/1999 | |
| WO | WO-2014180685 A1 * | 11/2014 | ........... G07B 15/063 |
| WO | WO-2018018306 A1 * | 2/2018 | ............. G07B 15/02 |

OTHER PUBLICATIONS

Extended Search Report issued in European Application No. 18175146.2, dated Oct. 22, 2018.

* cited by examiner

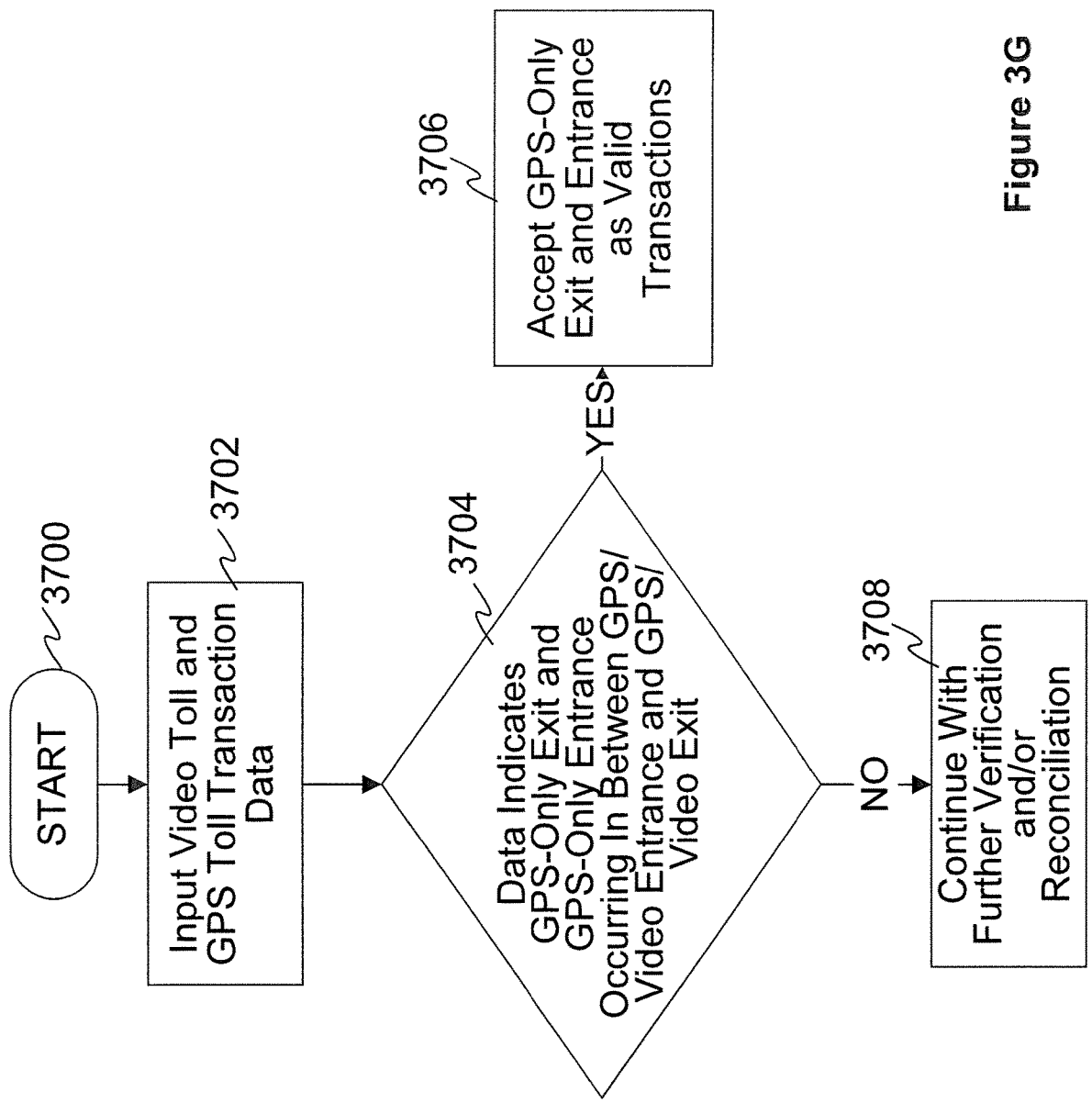

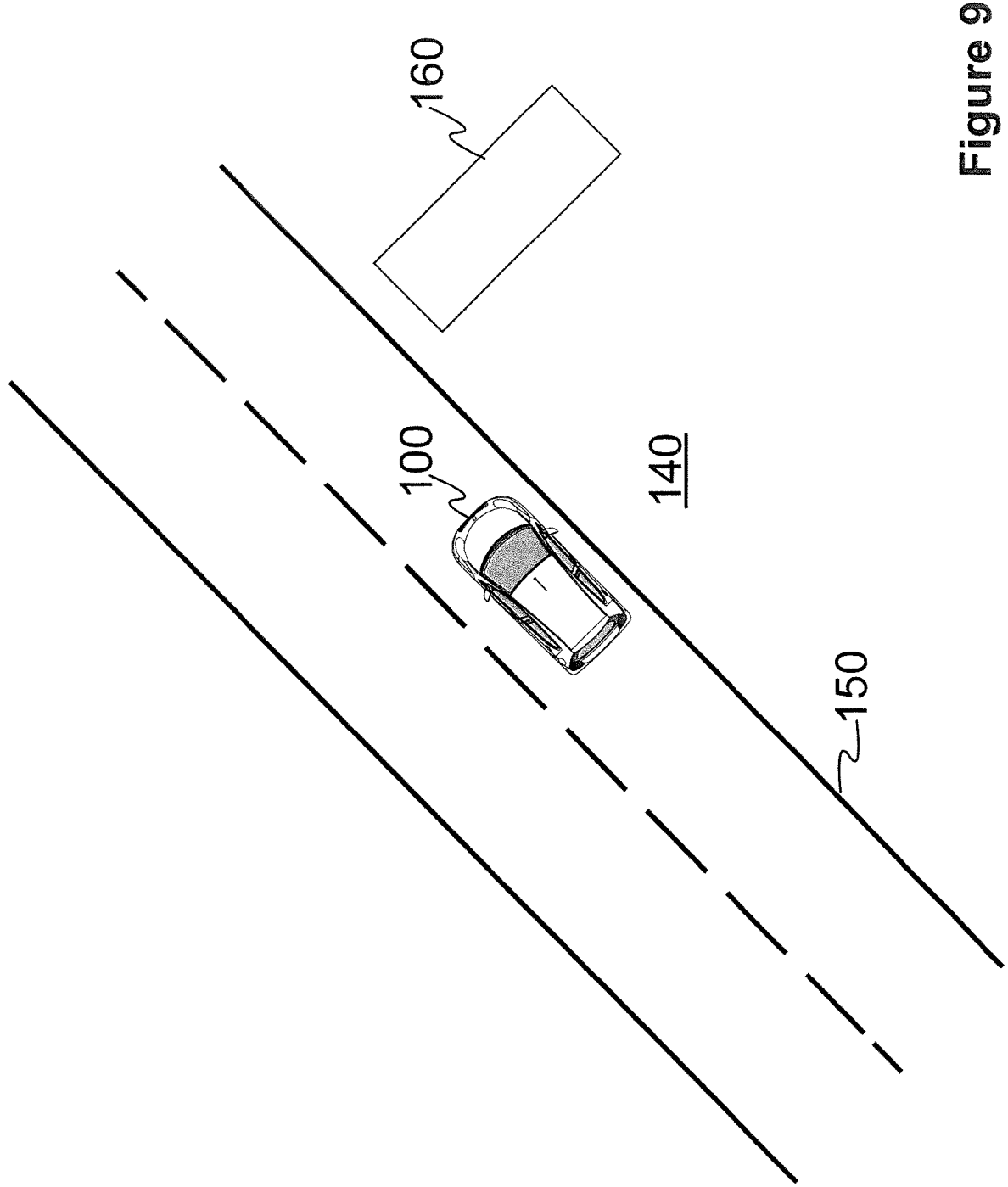

SYSTEM AND METHOD FOR VERIFICATION AND/OR RECONCILIATION OF TOLLING OR OTHER ELECTRONIC TRANSACTIONS, SUCH AS PURCHASE TRANSACTIONS

FIELD OF THE INVENTION

The present invention generally relates to the field of electronic vehicle tolling. More specifically, the present invention relates to a system and method for verifying electronic vehicle tolling transactions or purchase transactions, as well as reconciling different electronic vehicle tolling or purchase transactions.

BACKGROUND OF THE INVENTION

Use of toll roads provides benefits to both users of the road, as well as the owners or operators of such roads. Users benefit by having a less congested road to travel on, since typically, toll roads have fewer exits, entrances and other artifacts that tend to slow down the flow of traffic. Of course, there is a price to be paid for travelling on such toll roads, but at least the user is provided with such a choice, and for certain individuals the advantages of using such toll roads outweighs the financial costs associated for doing so. For the owners or operators of toll roads, the tolls collected help to pay for the upkeep and maintenance of the road, and if the road is managed efficiently, should result in a profit to the owner or operator, whether they be a private entity or a governmental entity.

The first toll roads employed human toll collectors to collect the toll from each user. As technology developed in the last quarter of the twentieth century, human or manual toll collection was gradually replaced with electronic toll collection. In these electronic systems, the user of a vehicle was provided with an onboard electronic unit, typically an RFID transponder, which allowed communication with roadside electronic equipment located at each tolling location. Each user would also register with the toll authority or operator entity which collects the tolls for the road, and as part of this registration, the user would provide identifying information, as well as bank or payment information to be used to pay for tolls as they are incurred by the user. Additionally, the registration may include temporal information, such that the user may select registration or activation which is effective only for a limited period of time, which may be useful in the case of rental cars or other types of temporary vehicle operation. In operation, as a vehicle approached a tolling location, the onboard RFID transponder would communicate with the roadside equipment, such that the roadside equipment was provided with sufficient information to identify the vehicle, and thus charge an appropriate toll to the user. Oftentimes, the toll authority or operator entity would also maintain photo enforcement equipment in conjunction with the roadside equipment. The photo enforcement equipment would be used to record a photo (or series of photos or video) of vehicles as they passed through a tolling location. The photo information, in conjunction with OCR (optical character recognition) functionality allows the ability to extract license plate information from the photos to thereby identify the vehicle. Such photo information could thus be used to confirm toll transactions, or alternatively, could be used as part of a dispute resolution mechanism in case a user disputes a toll transaction, the onboard RFID transponder fails, or any other reason.

RFID transponder systems, while being generally efficient and accurate, required the user to first register and obtain an RFID transponder. If a user is not registered and does not have an RFID transponder they cannot automatically pay tolls as they encounter toll locations. To remedy this situation, toll authorities and operator entities sometimes use the photo enforcement capability as an additional mechanism for collecting tolls. By using the photo information (and license plate recognition), users without RFID transponders can be charged for tolls as they drive through the various tolling locations. The license plate information is used in conjunction with vehicle registration information to identify a vehicle owner and address, and the tolls incurred are provided in a statement sent to the vehicle owner, and the owner simply submits payment for the tolls they incurred.

The above-described tolling systems typically require some additional structure to operate, such as the onboard RFID transponders, roadside equipment, photo enforcement equipment and the like. More recently, tolling systems have been developed which eliminate the need for much, and sometimes all of this equipment. Such tolling systems utilize the concept of virtual tolling locations. In other words, specific coordinates (latitude, longitude, for example) are specified for tolling locations without the need to locate specific hardware or equipment at the virtual toll location, and in conjunction with a user's mobile device, which is used to continually report its location as the user travels, using GNSS (Global Navigation Satellite System), for example, it can be determined if a user has passed through a virtual tolling location. It should be noted that references herein to GNSS are meant to refer to any type of positioning system, including, for example GPS (Global Positioning System), and the terms GNSS and GPS may be used interchangeably. Identifying when a user passes through a virtual toll location may be implemented in many different ways. For example, the user's mobile phone may be provided with a list of virtual toll locations, and as the mobile phone encounters any of these locations (by comparing its location with the list of tolling locations), it can communicate to the toll authority or other service provider, that it has passed through a virtual tolling location. Such an approach requires that the list of tolling locations be distributed to all users and also requires additional computation and processing on the user side. As an alternative which does not have these requirements, the user's mobile phone may simply provide its location as the user travels. This location information is received by the toll authority or service provider, and it is the toll authority or service provider which compares the user location and determines when the user has passed through a virtual toll location.

Although these virtual tolling systems offer many advantages, they do have significant shortcomings. If the user does not activate the tolling or location feature on their mobile phone, it is essentially impossible to charge the user for tolls they incur. Additionally, if the electronic toll transaction using GNSS location information is inaccurate or incomplete, it is very difficult and sometimes impossible to charge the toll to the user. While different approaches have tried to solve this problem by utilizing the photo enforcement information, often times there are conflicts or inconsistencies when using such information. Thus, there is a need for an improved virtual tolling system which can increase the accuracy and/or reliability of electronic toll transactions in the context of virtual toll systems. The present invention addresses those needs.

SUMMARY OF THE INVENTION

In an embodiment, the present invention relates to a system and method for improving the accuracy and reliability of electronic toll transactions, particularly toll transactions generated in the context of virtual toll systems. In an embodiment according to the present invention, the GNSS toll transaction data for a toll event is analyzed in conjunction with the corresponding photo or video toll transaction data to reconcile the two types of data, to see if there is a match between them, or to see if the two types of data are consistent with each other. This greatly increases the accuracy of determining a true toll transaction which should properly be charged to the user. For example, this analysis may involve looking at the time and location for each transaction to see if it is physically possible (e.g., by calculating a user's speed) for the user to have triggered both transactions. If the calculation indicates an impossible user speed, then this is used to determine that the transactions are inaccurate and should not be charged. Alternatively, a transaction at issue of one type (either GPS or photo/video) may be compared against an earlier known valid transaction in a similar fashion to see if the calculated speed between the two transactions is physically possible. The former approach of looking at generally contemporaneous transactions may be used when there is a relatively short time between transactions (e.g., a few seconds or minutes), while the latter approach of comparing against a previously known valid transaction may be used when the time difference between transactions is much longer (e.g., on the order of hours or longer).

In an alternative embodiment according to the present invention, the GNSS toll transaction data is checked against the photo or video toll transaction data to see if there is a proper 1:1 correspondence between the two types of data, or alternatively if multiple transactions of one type have been generated, but only a single transaction of another type, thus indicating an error in the generation of the multiple transactions. Once this error is detected, it can guide the system to prevent the generation of multiple erroneous toll charges to the user.

In yet another alternative embodiment according to the present invention, the relative timing and location of the GNSS toll transactions against the photo or video toll transactions may be used to determine which of the two types of transactions may be incorrect. For example, if the transaction data indicates successive exits from a toll road, then clearly one of those exit transactions is incorrect, since a user cannot exit a toll road twice without at least one intervening entrance transaction onto the same toll road. Similarly, if the transaction data indicates two successive entrances onto a toll road, then clearly one of those entrance transactions is incorrect, since a user cannot enter a toll road twice without at least one intervening exit transaction from the same toll road.

In a further alternative embodiment according to the present invention, the relative timing and location of the GNSS toll transactions against the photo or video toll transactions may be used to determine if there is a set of transactions (e.g., exit and then entrance) for which only one type of transaction is recorded (e.g., GPS or GNSS), but which plausibly could be correct based on a valid transaction (correct GPS and correct photo transaction) before and a valid transaction (correct GPS and correct photo transaction) after the set of GPS only transactions. This would be used to confirm the accuracy of the intervening GPS only transactions.

In yet a further embodiment according to the present invention, transaction data of one type (e.g., photo or video) can be verified by comparison to previous transactions. For example, time and location information for a transaction at issue can be compared with a user's known pattern of transactions to see if the transaction at issue fits the pattern or not. Similarly, a user's vehicle class noted during one transaction can be compared with a user's vehicle class noted during previous transactions to see if the vehicle class is consistent (indicating a likely accurate vehicle class as part of the transaction), or has changed (indicating a likely inaccurate vehicle class).

The various embodiments of the invention used to verify or reconcile or improve accuracy of transactions may be used individually, i.e., only one method used by itself, or alternatively may be used together, either in a successive fashion, i.e., implementation of one approach, followed by implementation of a second approach, and continuing, until a desired accuracy is obtained. In a slight variation, two or more of the multiple approaches may be implemented separately and then the results combined to achieve a composite result benefitting from the accuracy improvement provided by the multiple approaches together. In this latter approach, the individual results may be weighted, or alternatively, the accuracy achieved by each individual approach may be assessed over time, and only those approaches with a sufficiently high degree of accuracy are included in the verification and/or reconciliation process.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings:

FIGS. 3A through 3G are flowcharts illustrating various verification and/or reconciliation processes according to different embodiments of the present invention;

FIG. 9 is an illustration of a vehicle on a roadway.

DETAILED DESCRIPTION OF THE INVENTION

Figure 8:
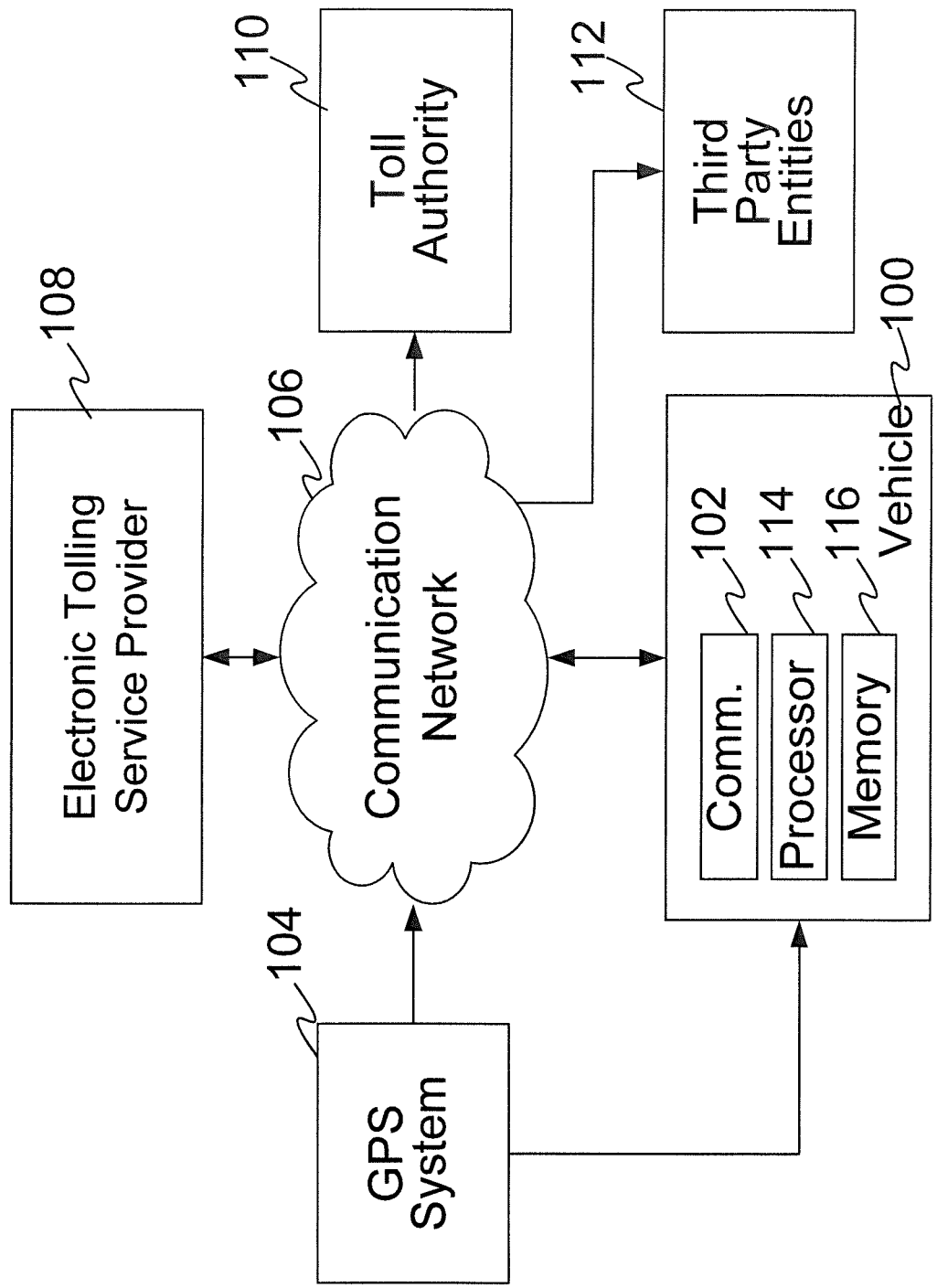
FIG. 8 is a block diagram illustrating components of an embodiment of the present invention.

Referring now to FIG. 8, therein is illustrated a block diagram depicting the major elements of an electronic toll system according to an embodiment of the present invention. In the system, there is a vehicle 100 which has associated with it a communication module 102. The communication module may be a separate or standalone mobile device, such as a mobile telephone or cellular telephone located within or in the vicinity of the vehicle, and having its own processor, memory and communication functionality. The communication module communicates over a communication network 106 to communicate with other entities. The communication module 102 may have the ability to communicate over a cellular network, wireless network, Wi-Fi network or any other available communications network, which may be part of communication network 106. Alternatively, the communication module may be a part of or embedded within the vehicle 100 and be part of the communication infrastructure which may be integrated within vehicle 100 itself to allow the vehicle to communicate with other vehicles or external systems. Vehicle 100 also includes a processor 114 and memory 116, which together facilitate the various communication and processing functions needed to be carried out by vehicle 100. The functionality of communication module 102 may also be implemented using a combination of both a separate device, such as a mobile phone, and additional circuits or systems which are part of the vehicle. For example, the separate mobile phone may provide the communication functionality, while the vehicle provides the processing and memory functionality. Although described herein as vehicle 100, it should be understood that reference to vehicle 100 may also include reference to the driver or user operating the vehicle 100 and interacting with the rest of the system as illustrated in FIG. 8.

Vehicle 100 is in communication with and receives location information from GPS (global positioning system) system 104, as is well known in the art, and utilizes this information to determine its location. Typically, to determine its location by way of GPS system 104, vehicle 100 receives signals from a number of satellites (e.g., three or four satellites, or more) orbiting the earth, and triangulates or performs other computations using the received signals to determine the location of the vehicle. This location determination may be performed by the vehicle's processor 114, or alternatively may be within the functionality of communication module 102, e.g., when the GPS functionality is provided by a cellular or mobile phone that corresponds to communication module 102. The communication between vehicle 100 and GPS system 104 may be directly by way of the vehicle 100 receiving location information from GPS system 104, or alternatively may be by way of communication network 106 in the case where GPS location information is provided through the communication network 106.

Vehicle 100 is also in communication with an electronic tolling service provider 108, by way of communication network 106. In this manner, vehicle 100 can exchange information, as explained in further detail herein, with electronic tolling service provider 108. By way of example, vehicle 100 may communicate to electronic tolling service provider 108 information indicating that vehicle 100 has passed a tolling point, such as a virtual tolling point. Also, electronic tolling service provider 108 may also communicate to vehicle 100 information related to virtual tolling points, such as location. Electronic tolling service provider 108 includes information regarding the various tolling locations (e.g., geocoordinates), toll rates or schedules established by the toll authority 110, as well as information regarding the various tolling accounts set up by individual users of the system. Electronic tolling service provider 108 also includes a processor and memory to perform the various functions described herein.

Communication network 106 also provides the ability for electronic tolling service provider 108, toll authority 110, as well as third party entities 112 to communicate with each other in order to exchange information. By way of example, toll authority 110 may provide to electronic tolling service provider 108 the location information for the various tolling locations. Also, electronic tolling service provider 108 may obtain from toll authority 110 video or photo information relating to tolling events, which are generated as a vehicle encounters a toll location equipped with photographing capabilities. Further, third party entities 112, such as banks and the like, may provide payment and account information to toll authority 110 and/or electronic tolling service provider 108.

For the vehicle 100 or its operator to utilize the electronic tolling system of the present invention, the user has to first obtain an appropriate "app" to be used with the communication module 102, e.g., from the website of the toll authority 110 or the electronic tolling service provider 108, or alternatively from a third party "app" provider, such as an app store.

The high level operation of the system will now be described with reference to FIG. 9. As vehicle 100 travels along roadway 150, as soon as it reaches a predefined virtual tolling area, such as area 140, the vehicle 100 will determine that it has passed through or by the virtual tolling area and will register this event, as well as notify electronic tolling service provider that the vehicle 100 has passed through or by the virtual tolling area 140. This series of steps will result in what is referred to as a GPS toll transaction. In the same general timeframe, roadside equipment 160, typically operated by toll authority 110 will sense that a vehicle 100 has gone through or by the virtual tolling area 140, and will cause a photograph or a series of photographs or videos to be recorded of the vehicle 100 passing through. One objective of this is to visually record the license plate number of the vehicle 100 passing nearby the roadside equipment 160. This series of events results in what is referred to as a video toll transaction. While roadside equipment 160 is illustrated as being along one side of the road, alternatively, it may be located along both sides, across the road (e.g., mounted on a gantry) or any other location that allows for the equipment to capture photo and/or video information of passing vehicles.

Figure 1:
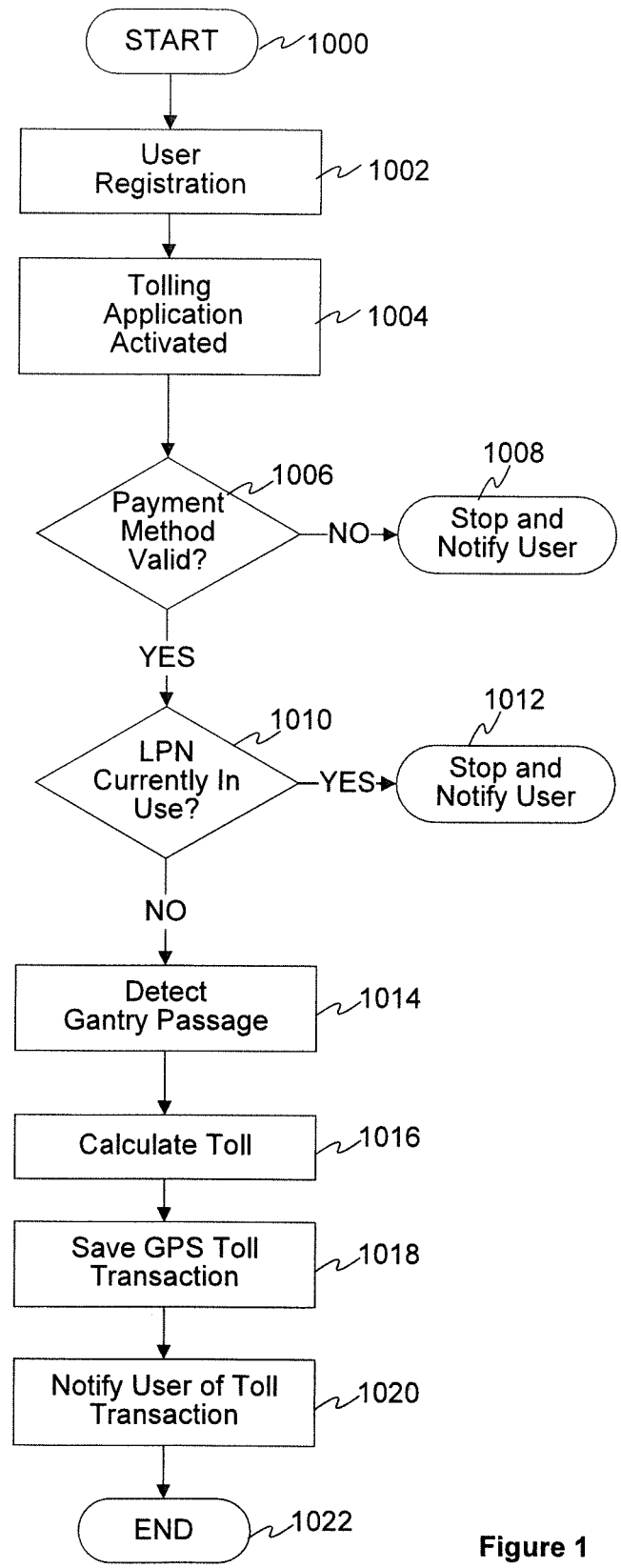
FIG. 1 is a flowchart illustrating an electronic tolling process.

The operation of this system of the present invention is also illustrated and described with reference to FIG. 1. It should be noted that some portions or steps shown in FIG. 1 are performed at or by the user of the vehicle, some are performed at or by the electronic tolling service provider, and some represent joint or combined action between the vehicle/user and the electronic tolling service provider. After the process has been started at step 1000, the user must register with the electronic tolling service provider at step 1002. With the appropriate "app" downloaded by the user, as discussed above, the user can proceed to register with the electronic tolling service provider in a conventional manner. For example, the registration process may require the user to provide their name, address, license plate, typical number of occupants (for HOV purposes) and car information for the various cars it is wished to register, as well as payment information to provide payment for the tolls incurred by the user. For example, the payment information may include bank account information, credit card information, debit card information, PayPal account information, cellular telephone account information, or any other payment mechanism the user wishes to associate with their electronic tolling account.

Once the user is registered with the electronic tolling service provider 108, whenever the user wishes to desire to use the electronic tolling system, at step 1004, the tolling application must first be activated at or before the time the user incurs a toll. This may be achieved, for example, by the user manually activating the electronic tolling "app" on their mobile device. Alternatively, the vehicle 100 may detect that it is in motion (e.g., based on speedometer information, GPS location information, or any other mechanism suitably appropriate for indicating vehicle motion), and then automatically activate the electronic tolling "app" of the user's mobile device or of the communication module 102 which may be embedded within the vehicle. Similarly, the electronic tolling "app" may be manually deactivated by the user or alternatively, automatically deactivated based on sensing that the vehicle is no longer in motion for a sufficiently long period of time, in order to avoid prematurely deactivating the electronic tolling "app" due to a momentary stopping of the vehicle. Next, at step 1006, a check is made by the electronic tolling service provider 108 of whether the user's payment method is currently valid or in case a pre-paid account is used, there needs to be sufficient funds available in the user's pre-paid account. If the current payment method is not valid, or in the case where a pre-paid account is used and there are insufficient funds available in the pre-paid account, then the user is notified at step 1008, and the electronic tolling process is stopped, and the user cannot use their mobile device or vehicle systems to pay for and incur tolling charges.

If instead, at step 1006 it is determined that the user's payment method is currently valid, then the process proceeds to step 1010, where the electronic tolling service provider 108 determines whether the user's license plate number associated with the activated tolling "app" is already in use, i.e., it has already been activated and is currently activated. If so, then the process proceeds to step 1012 and the electronic tolling service provider 108 notifies the user that the license plate number is already in use, and cannot be simultaneously used in two or more instances and the process is stopped, so that the user cannot utilize the electronic tolling system using a second instance of an already activated license plate number.

If instead, at step 1010 it is determined that the license plate number attempting to be activated is not already activated and in use, then the process proceeds to step 1014, where the electronic tolling service provider determines that the vehicle 100 has passed a virtual toll gantry or toll location. This determination may be as a result of communication from the vehicle (e.g., the user's "app") communicating to the electronic tolling service provider 108 that the vehicle has passed by or through a virtual toll gantry location (see FIG. 9). This communication can include the location of the virtual gantry, vehicle identification information (e.g., vehicle class, license plate number, and the like), date, time and other identifying information. After it has been determined that a virtual gantry has been passed by the vehicle 100, then the appropriate toll is calculated for the particular virtual tolling location. This calculation may be performed by the electronic tolling service provider 108 utilizing toll schedules and other pertinent information provided by toll authority 110. Alternatively, the toll calculation may be performed by the vehicle 100 (or user associated with the vehicle and/or the user's mobile or communication device) if the appropriate tolling information is provided to the vehicle 100 and/or user. Regardless of which entity calculates the actual toll amount, the toll transaction resulting from the passing of the virtual gantry location is stored as a GPS toll transaction by the electronic tolling service provider 108, and the tolling process ends at step 1022. Of course, the tolling process of FIG. 1 may be repeated whenever the electronic tolling "app" is activated, or whenever a virtual gantry tolling location is detected, e.g., during a later segment of a trip undertaken by the user.

In an embodiment of the present invention, a verification or reconciliation of either or both the GPS toll transaction and the video toll transaction is performed in order to improve the accuracy and reliability of the overall electronic tolling process. As will be described in detail, in some instances GPS toll transactions are compared to contemporaneous video toll transactions, in other instanced, a current GPS toll transaction is compared with reference to earlier GPS and/or video toll transactions, in yet other instances, a video toll transaction is compared to earlier GPS and/or video toll transactions, in an effort to detect and discard erroneous toll transactions (either GPS or video) to thereby improve the accuracy of the overall electronic tolling system. This verification and/or reconciliation is typically performed by the electronic tolling service provider 108.

Figure 2:
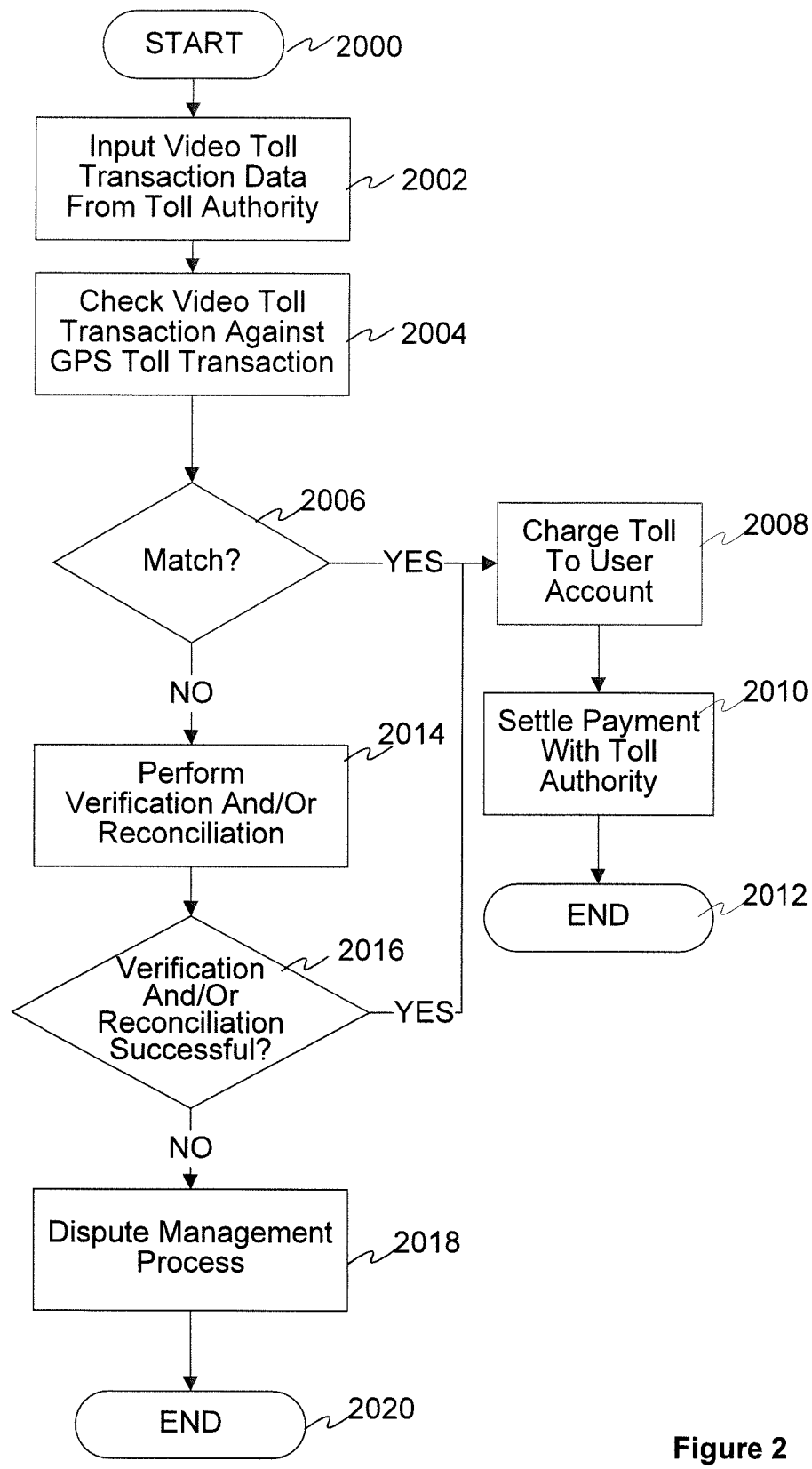
FIG. 2 is a flowchart illustrating further aspects of an electronic tolling process.

This process of improving the accuracy of the electronic tolling system will now be described by way of reference to FIG. 2. Referring now to FIG. 2, the reconciliation and/or verification process begins at step 2000 and proceeds to step 2002, where the video toll data for a particular transaction is provided to the electronic tolling service provider 108. Typically, the video toll transaction data (e.g., photos, videos and the like) is collected by the toll authority 110 by way of roadside equipment 160 (see FIG. 9). In addition to, or in place of the raw video data, the toll authority may provide additional data, such as time, location, and date, as well as information extracted by various recognition processes carried out on the visual data (e.g., use of OCR optical character recognition to determine license plate numbers and the like).

Next, at step 2004, the electronic tolling service provider 108 checks the video toll transaction data for a particular toll transaction against the corresponding GPS toll transaction data, to see if there is a match (step 2006). This checking may involve a comparison for each type of transaction (e.g., GPS or video) of date/time information, location information or a combination thereof—each with some degree of tolerance. In other words, a time window may be used to compare transactions that are +/− a few seconds or minutes of each other. Similarly, a geo-window of +/− a few feet or tens of feet may be used identify which transactions to be compared to each other. If there is a match at step 2006, then the toll is verified as a correct and proper toll and is charged to the user (step 2008) utilizing the payment method specified by the user. Next, at step 2010, the electronic tolling service provider "settles" payment with the toll authority for the toll charge incurred by and paid for by the user. This settlement may be carried out on a transaction basis, user basis, daily basis or any other combination which is acceptable to the electronic tolling service provider 108 and toll authority 110. The process then ends at step 2012, and can, of course, be carried out for another transaction which it is desired to verify or reconcile.

If instead at step 2006, it was determined that there was not a match between the GPS transaction and the presumptively corresponding video transaction, then the process proceeds to step 2014 to carry out the verification and/or reconciliation contemplated by the present invention. Further details of the verification and/or reconciliation process 2014 will be explained below with reference to FIGS. 3A through 3G. After the verification and/or reconciliation process is performed, the process proceeds to step 2016 to determine if the verification and/or reconciliation was successful, e.g., could the transaction in question be verified, and thus increasing the accuracy of the overall process, or similarly could the transaction in question be reconciled with one or more other transactions, again increasing the overall accuracy and reliability of the electronic tolling system.

It should be noted that one or more of the verification and/or reconciliation processes described herein may be carried out, either individually in the case of just one process, or alternatively successively or cumulatively when more than one process is carried out. In yet another alternative, several processes may be carried out (to analyze the same sets of data), and the result of each individual process is accumulated with the results of the other processes carried out (on the same sets of data) in order to arrive at a comprehensive or composite result, which benefits from the cumulative results obtained from multiple verification and/or reconciliation processes.

Furthermore, it should be noted that the verification and/or reconciliation process may happen in real time, or substantially in real time, with respect to the toll transaction at issue, or instead may happen at some later time. The latter approach may be advantageous since such verification and/or reconciliation typically involves obtaining and comparing video toll transaction data and/or GPS transaction data, and in the case of video toll transaction data, such data must be obtained from the toll authority 110. Instead of having to separately obtain video toll transaction data separately for each transaction, it may be advantageous to utilize batch communication where, for example, each day, the video toll transaction data for transactions captured during the immediately preceding day are downloaded together as one larger communication from the toll authority 110 to the electronic tolling service provider 108, instead of a number of separate communications, one for each separate toll transaction.

Figure 3A:
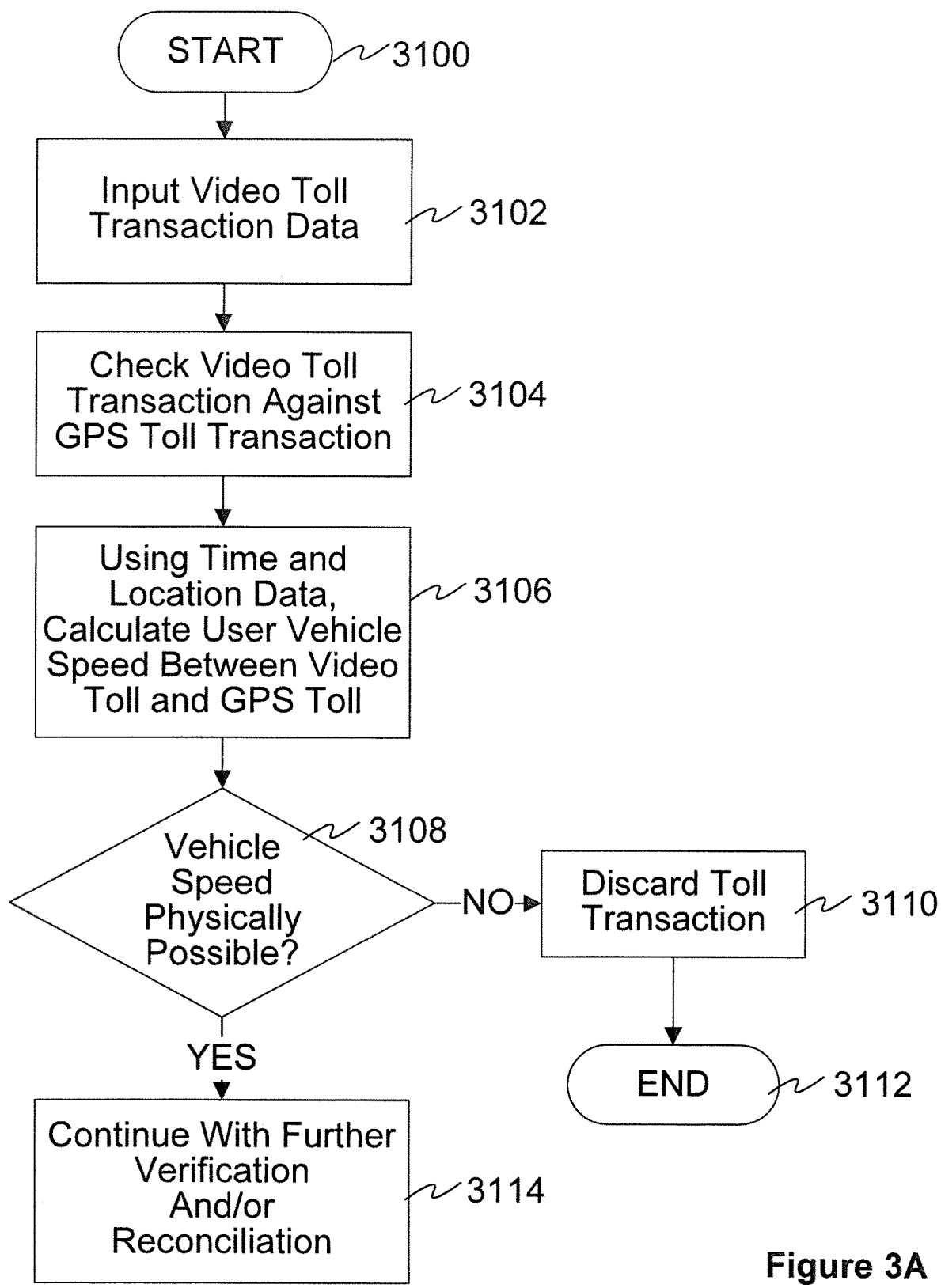

Referring now to FIG. 3A, therein is illustrated a first embodiment of a verification and/or reconciliation process, as mentioned above with respect to step 2014 of FIG. 2. In the process of FIG. 3A, the video toll data corresponding to a particular transaction which is the subject of the verification and/or reconciliation process is first obtained from the toll authority at step 3102. This video toll transaction data is checked against the presumptively corresponding GPS toll transaction data (step 3104), and specifically, this checking includes utilizing the time and location data associated with each transaction (i.e., each of the video and GPS toll transactions that are being checked against each other), to calculate a vehicle speed between the video toll transaction location and the GPS toll transaction location (step 3106). If this calculated vehicle speed is not physically possible, e.g., if the calculated vehicle speed exceeds a reasonably possible or likely maximum vehicle speed, such as, for example, 100 miles per hour or 150 miles per hour, then the process proceeds to step 3110 and the toll transaction is discarded, since there is no agreement between the video toll transaction data and the GPS toll transaction data. If instead, at step 3108 it is determined that the calculated vehicle speed is physically possible, then the process proceeds to step 3114 and further verification and/or reconciliation is performed, using, for example of the other verification and/or reconciliation processes described herein. This is due to the fact that at this step 3114, the verification and/or reconciliation process of FIG. 3A was essentially inconclusive, in that it could not be determined whether the GPS and video data correspond to the same transaction, or could correspond to two separate transactions.

Alternatively, a transaction at issue of one type (either GPS or photo/video) may be compared against an earlier known valid transaction in a similar fashion to see if the calculated speed between the two transactions is physically possible. The former approach of looking at generally contemporaneous transactions may be used when there is a relatively short time between transactions (e.g., a few seconds or minutes), while the latter approach of comparing against a previously known valid transaction may be used when the time difference between transactions is much longer (e.g., on the order of hours or longer).

Figure 3B:
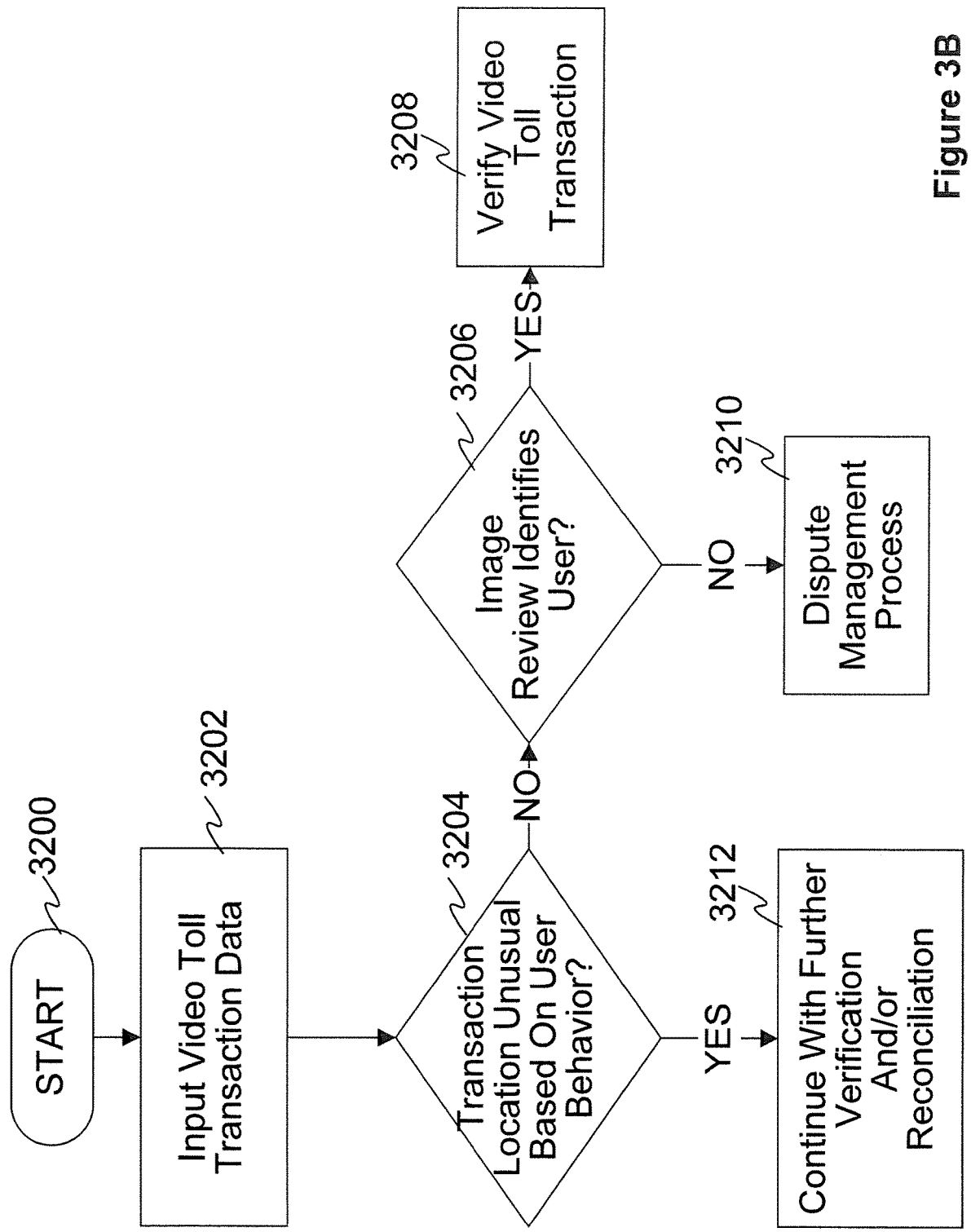

Referring now to FIG. 3B, therein is illustrated another embodiment of a verification and/or reconciliation process according to the present invention. In the process of FIG. 3B, the process starts by obtaining the video toll transaction data (step 3202). Next, a determination is made as to whether the time and location information associated with the video toll transaction is unusual based on the user's know behavior (step 3204). This determination involves a comparison of the time/location information against previous time/location information for a number of transactions associated with the same user to see if the transaction at issue is outside the norm for such a user. In such a comparison, the electronic tolling service provider makes use of a stored database which accumulates over time, the time/location information for a user's toll transaction over a period of time. For example, if a user normally commutes to work at 8 am and travels a particular route at that time and encounters a specific toll location along that route at generally the same time (allowing for variances due to traffic, user delay and the like), then the database will reflect a pattern corresponding to such time/location behavior, so that if a transaction is encountered outside that pattern, it may be flagged as a potentially unreliable or inaccurate transaction. For example, if the transaction at issue concerns the same location, but is instead logged at 10 am, then this would be outside the normal expected behavior for that user.

If at step 3204, the process indicates that the transaction at issue is not unusual based on the user's past behavior, then the process continues to step 3206 and a review is undertaken of the corresponding image data obtained from the video toll data to determine if the image data identifies the user (e.g., if the image data identifies the license plate number associated with the user's account). If the determination at step 3206 properly identifies the user, then the transaction is identified as being correct and is verified and charged to the user (step 3208). If instead at step 3206, the image review is unable to properly identify the user, then the process continues to step 3210 and the transaction is submitted for a dispute management process in accordance with the appropriate business rules established, for example, by the toll authority 110.

If instead at step 3204, it is determined that the transaction is considered to be unusual based on the user's known behavior, then the process continues to step 3212 and further verification and/or reconciliation is carried out, since the process of FIG. 3B was unable to determine conclusively that the transaction should be discarded, since for example, the transaction at issue may be outside the user's typical behavior, but still be a valid transaction. For example, instead of commuting to work at 8 am, the user was instead commuting to work at 10 am since they had a dentist appointment to attend to.

Figure 3C:
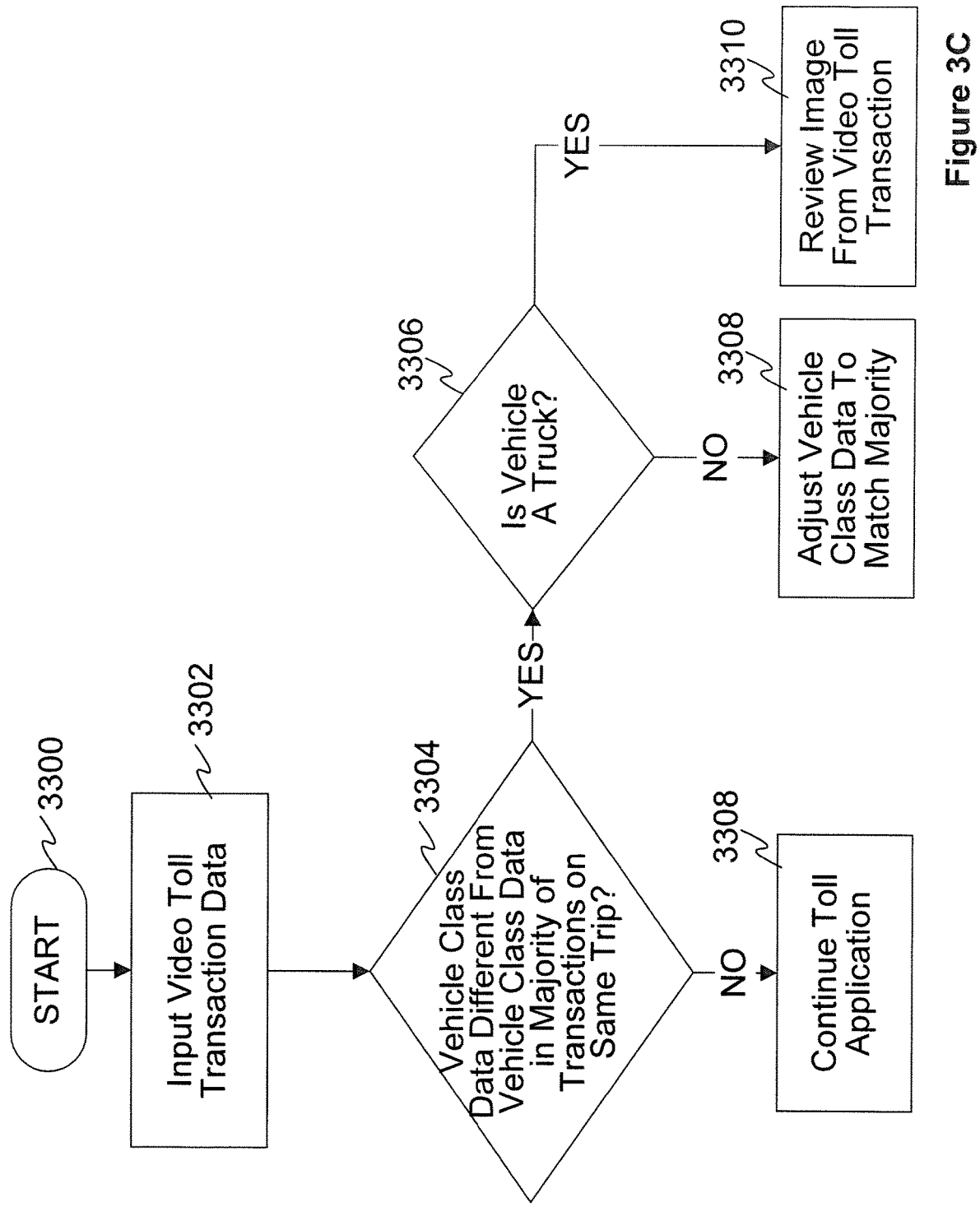

Referring now to FIG. 3C, therein is illustrated another embodiment of a verification and/or reconciliation process according to the present invention. In the process of FIG. 3C, the process starts by obtaining the video toll transaction data (step 3302). Next, a determination is made as to whether the vehicle class identified with the transaction at issue is the same as or different from the vehicle class identified in a majority of other transactions associated with the same trip the user is taking (step 3304). To properly make this determination, the electronic tolling service provider 108 may maintain a list or log of the vehicle class identified in earlier toll transactions associated with the same user and associated with the same trip the user is taking. The user trip may be defined in various ways, including, for example, all toll transactions incurred during one activation phase of the user's tolling "app" may be considered as one trip. Alternatively, all tolls incurred on a single roadway within a certain time window may be considered as one trip. There are many other ways of defining a user trip, as would be readily understood by a person of ordinary skill in the art.

If at step 3304 it is determined that the vehicle class associated with the toll transaction in question is different from a majority of toll transactions for the same trip, then the process continues to step 3306, where it is further determined whether the vehicle class is a passenger automobile or a truck. The reason for this additional auto/truck determination is that a truck may in fact change its class during the course of a trip, for example, where a tandem truck disengages one of its cars during a trip. In contrast, a passenger automobile typically does not change its class (e.g., the number of axles) during the course of a trip. If at step 3306 it is determined that the vehicle is not a truck, then the process continues to step 3308, where the vehicle class for the toll transaction in question is changed to match the vehicle class noted for the majority of toll transactions associated with the same trip.

Alternatively, if at step 3306 it is determined that the vehicle class is a that of a truck, then the process continues to step 3310 where the image data from the video toll transaction is reviewed in an effort to determine what the actual vehicle class is.

If at step 3304 it is determined that the vehicle class is not different from that noted for the majority of toll transactions that make up the same trip, then the process continues to step 3308, and the toll transaction is further processed in the normal course, as set forth in FIGS. 1 and 2.

Figure 3D:
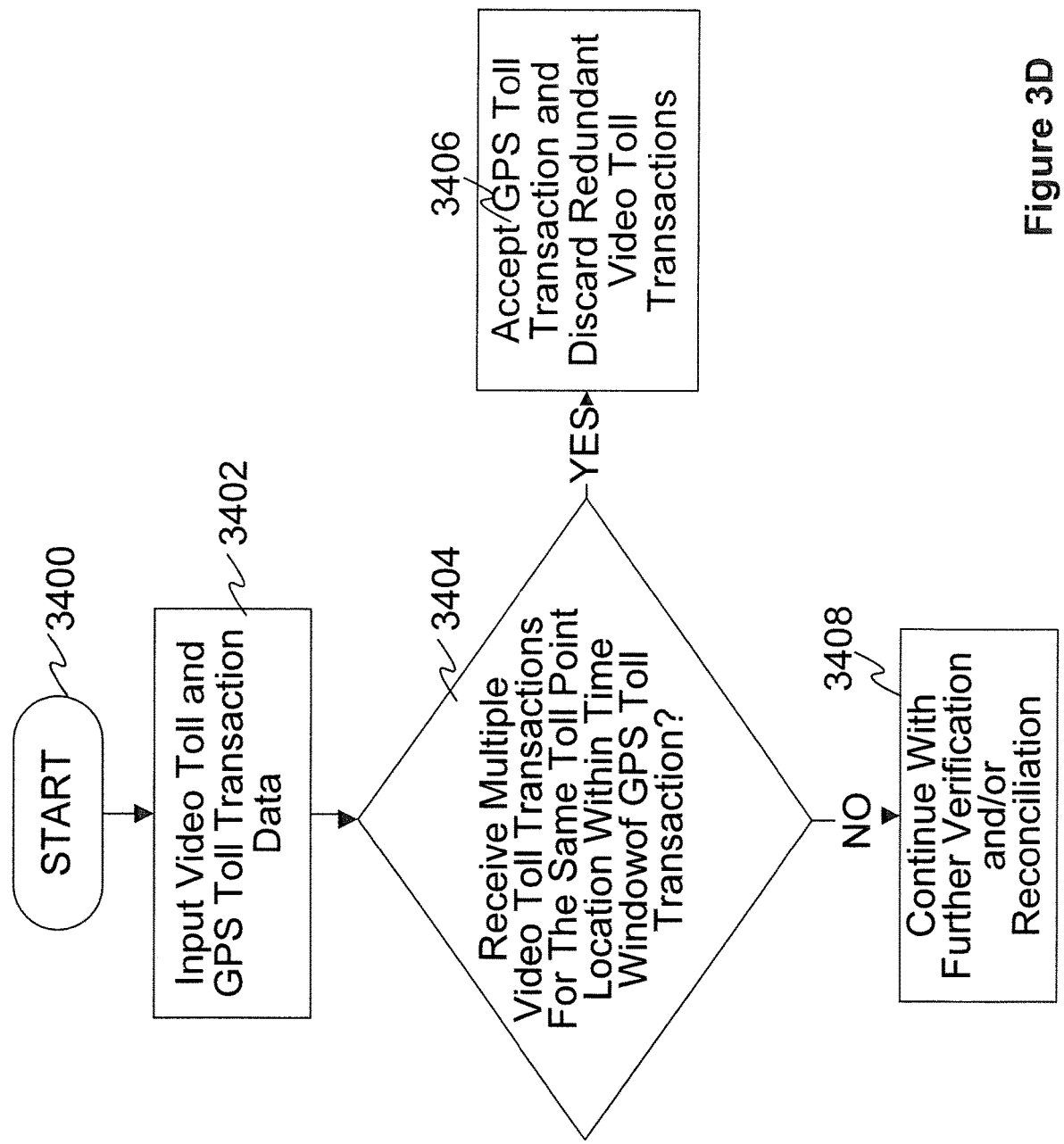

Referring now to FIG. 3D, therein is illustrated yet another verification and/or reconciliation process. The process of FIG. 3D starts by obtaining the video toll and GPS toll transaction data for a particular transaction at issue (step 3402). Next, at step 3404 it is determined whether multiple video toll transactions for the same toll point location have been recorded within a predefined time window relative to a GPS toll transaction. If so, then the process continues to step 3406, where the single GPS transaction is accepted as the correct toll transaction, and the redundant or extra video toll transactions are simply discarded. In this way, the user is charged a single toll transaction as confirmed by the single GPS transaction, as opposed to multiple toll transactions as otherwise indicated by the erroneous or extraneous video toll transactions.

If at step 3404 it is determined that multiple video toll transactions for the same toll point location within a predefined time window relative a GPS toll transaction were not noted, then the process continues to step 3408 and further verification and/or reconciliation is performed in order to determine which of the video toll transaction or GPS toll transaction is correct and should be charged to the user.

Figure 3E:
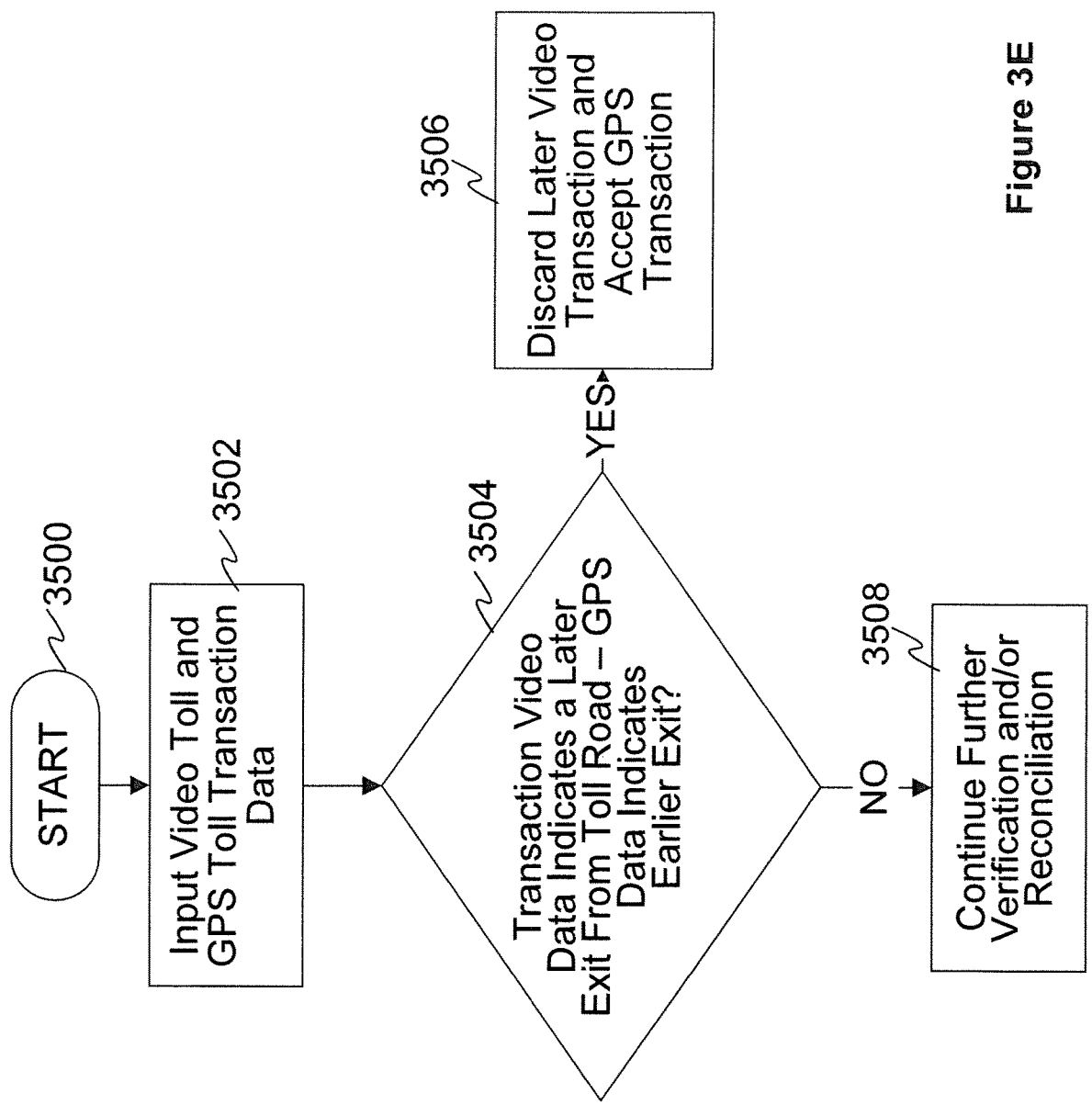
Figure 5:
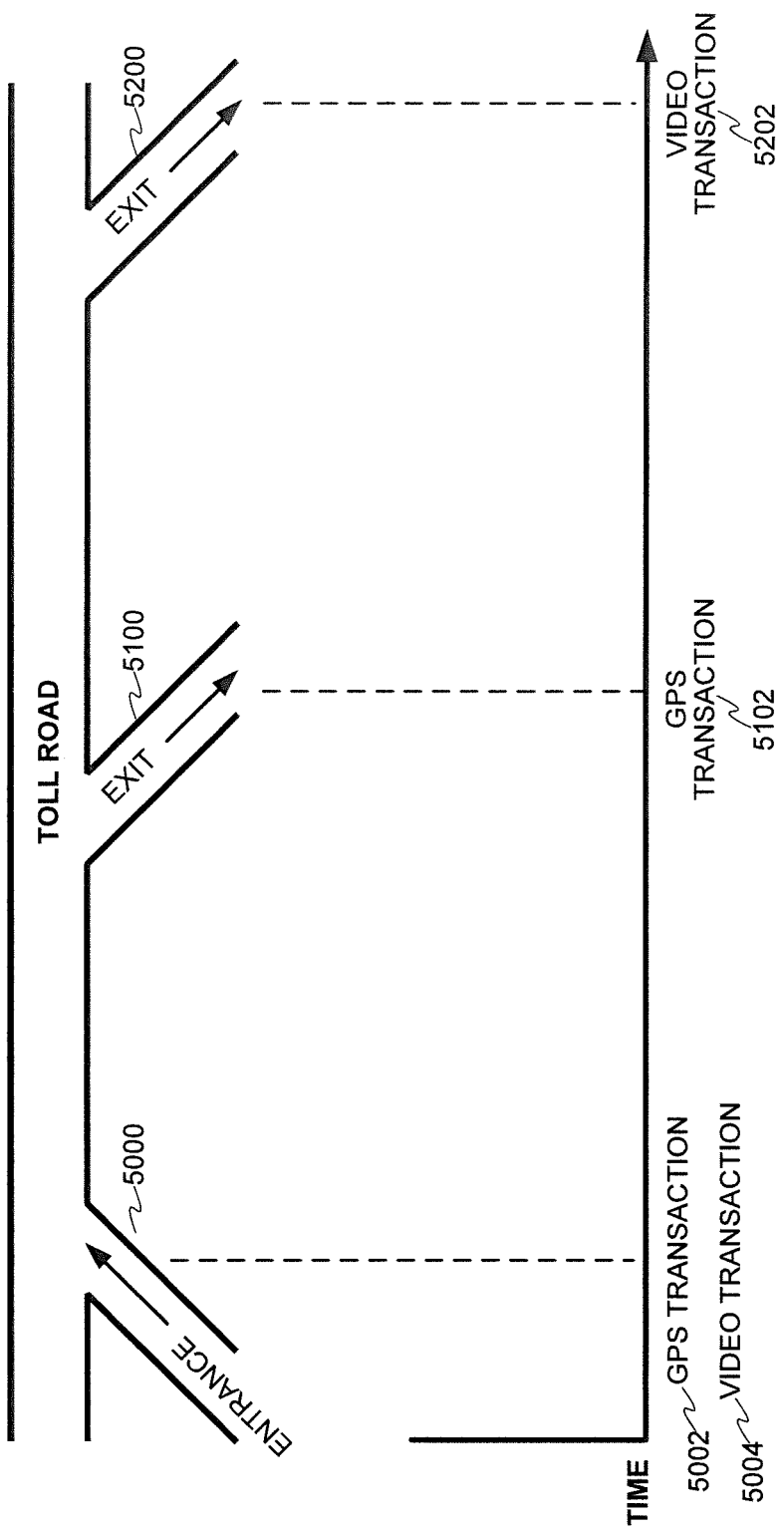
FIG. 5 is an illustration of a toll road and various GPS and video toll transactions relating to the verification and/or reconciliation process illustrated in FIG. 3E.

Referring now to FIG. 3E, therein is illustrated yet another verification and/or reconciliation process. The process of FIG. 3E starts by obtaining the video toll and GPS toll transaction data for a particular transaction at issue (step 3502). Next, at step 3504, a determination is made as to the relative timing and location between the GPS toll transactions, video toll transactions and toll "app" activation. Specifically, this determination seeks to determine whether the video toll transaction data indicates a later exit from a toll road, where the GPS toll transaction data also indicates an earlier exit from the same toll road at an earlier location. Practically speaking, if the toll data indicates an exit from the toll road (GPS toll transaction indicating an exit), then the same vehicle cannot also exit the same toll road at a later location without transaction data showing an entrance onto the same toll road. This situation is depicted in FIG. 5. As shown in FIG. 5, transactions 5002 and 5004 correspond to a GPS toll transaction and video toll transaction, respectively, indicating a vehicle entrance at location 5000 on the toll road. Next, GPS toll transaction 5102 indicates a vehicle exit from the toll road at location 5100. The presumptively erroneous transaction is the video toll transaction 5202 which seems to indicate a vehicle exit at a later location 5200 and the GPS toll transaction 5102 indicates an earlier exit from the toll road. Step 3504 is intended to detect this scenario of FIG. 5, and if this is found to be the case, then the process continues to step 3506 and the subsequent video toll transaction (e.g., 5202, FIG. 5) is discarded as an erroneous transaction. Alternatively, if at step 3504, the determination does not indicate the scenario of FIG. 5 has occurred, then the process continues to step 3508 and further verification and/or reconciliation is performed.

Figure 3F:
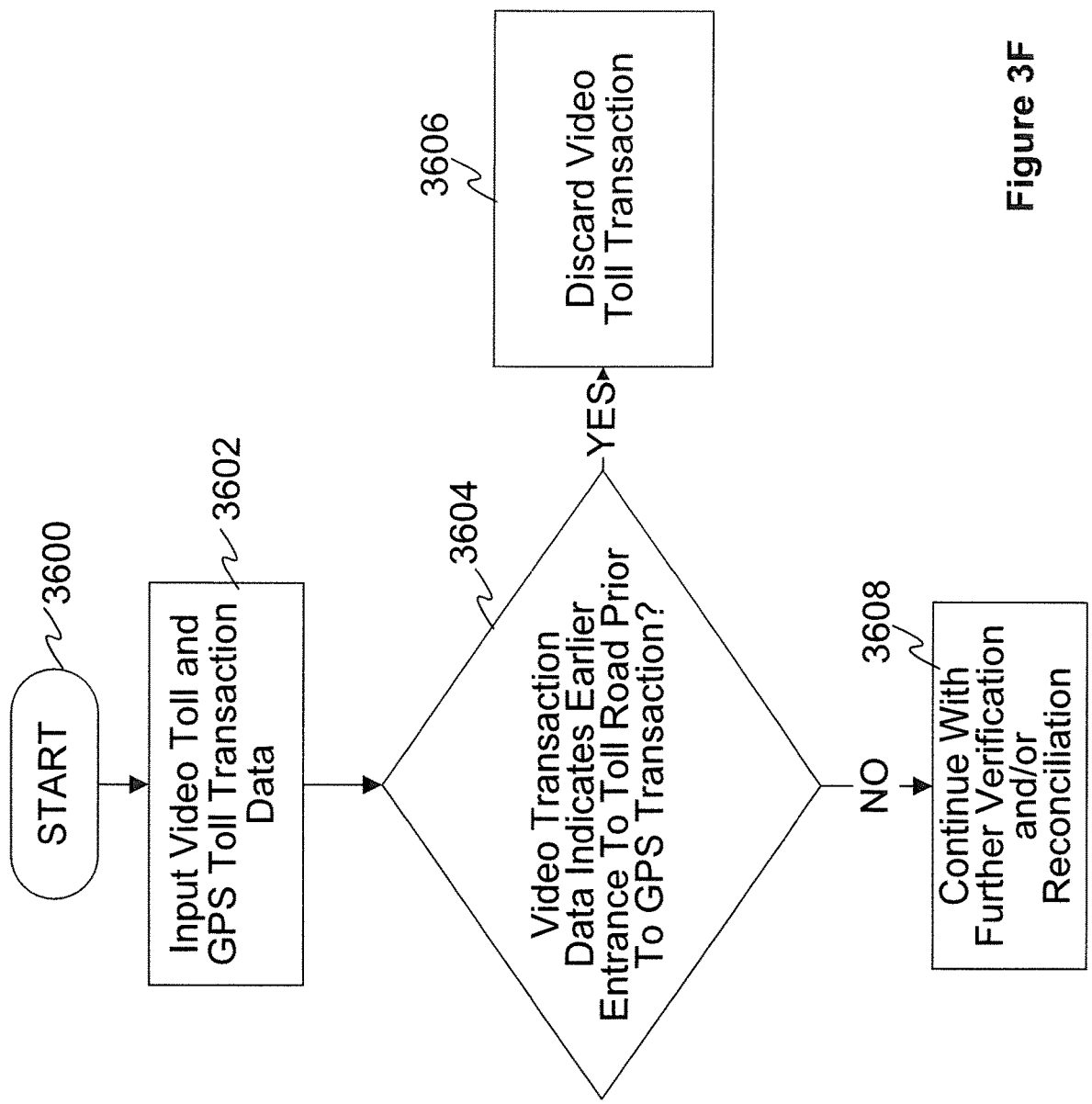
Figure 6:
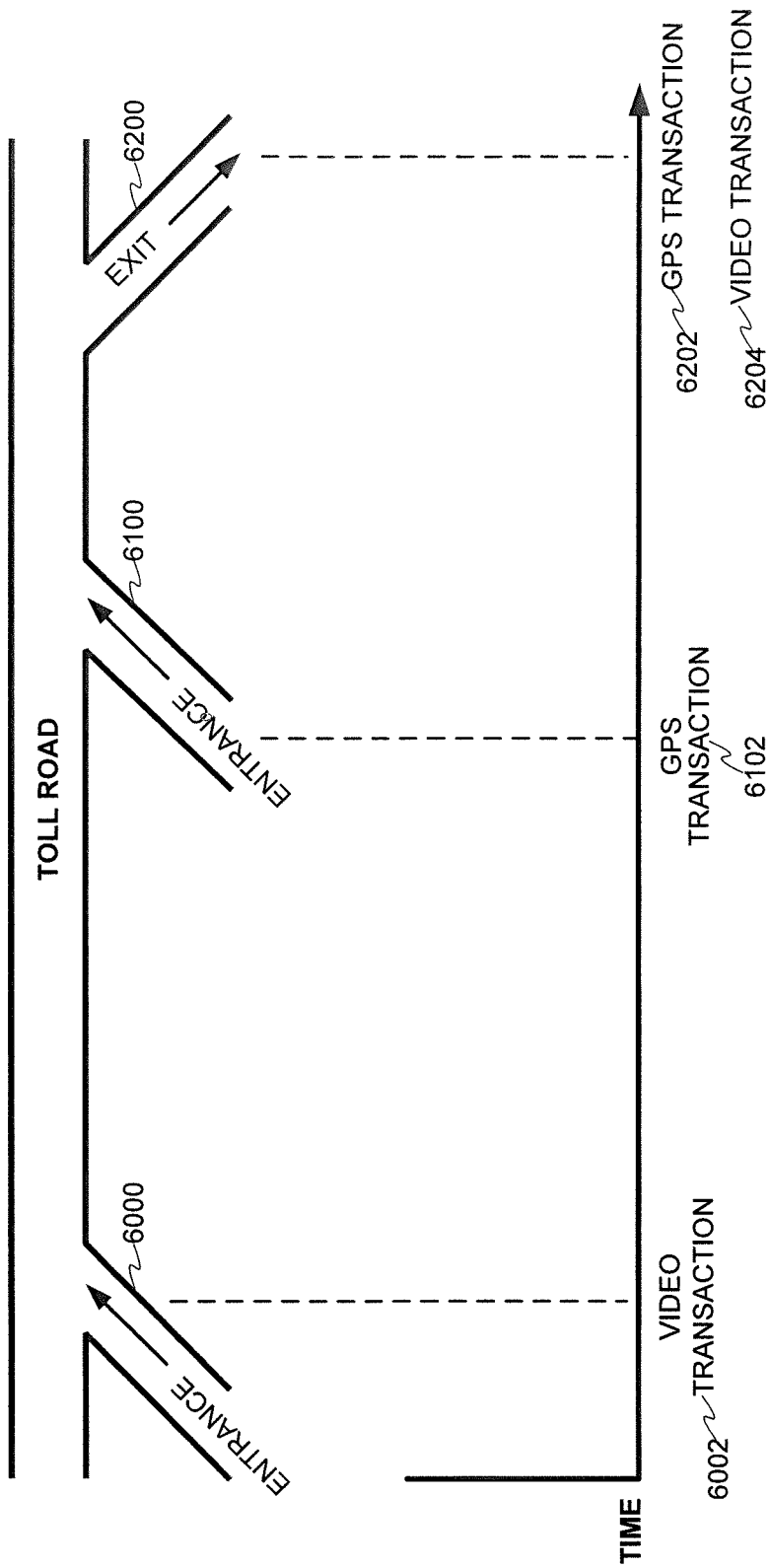
FIG. 6 is an illustration of a toll road and various GPS and video toll transactions relating to the verification and/or reconciliation process illustrated in FIG. 3F.

Referring now to FIG. 3F, therein is illustrated yet another verification and/or reconciliation process. The process of FIG. 3F starts by obtaining the video toll and GPS toll transaction data for a particular transaction at issue (step 3602). Next, at step 3604 a determination is made as to whether the video toll transaction indicates an earlier entrance onto a roadway and prior to a GPS toll transaction being recorded indicating entrance onto the toll road. This scenario is illustrated in FIG. 6. As shown in FIG. 6, video toll transaction 6002 indicates entrance onto a toll road at location 6000; however, this is prior in location with respect to GPS toll transaction 6102 indicating an entrance onto the toll road which is noted as occurring at a later location 6100 along the toll road. Further, at a later location and time, both GPS toll transaction 6202 and video toll transaction 6204 indicate an exit from the toll road at the same location 6200. Step 3604 is intended to detect the scenario of FIG. 6, and if this is found to be the case, then the process continues to step 3606 and the earlier video toll transaction (e.g., 6002, FIG. 6) is discarded as an erroneous transaction. Alternatively, if at step 3604, the determination does not indicate the scenario of FIG. 6 has occurred, then the process continues to step 3608 and further verification and/or reconciliation is performed.

Figure 7:
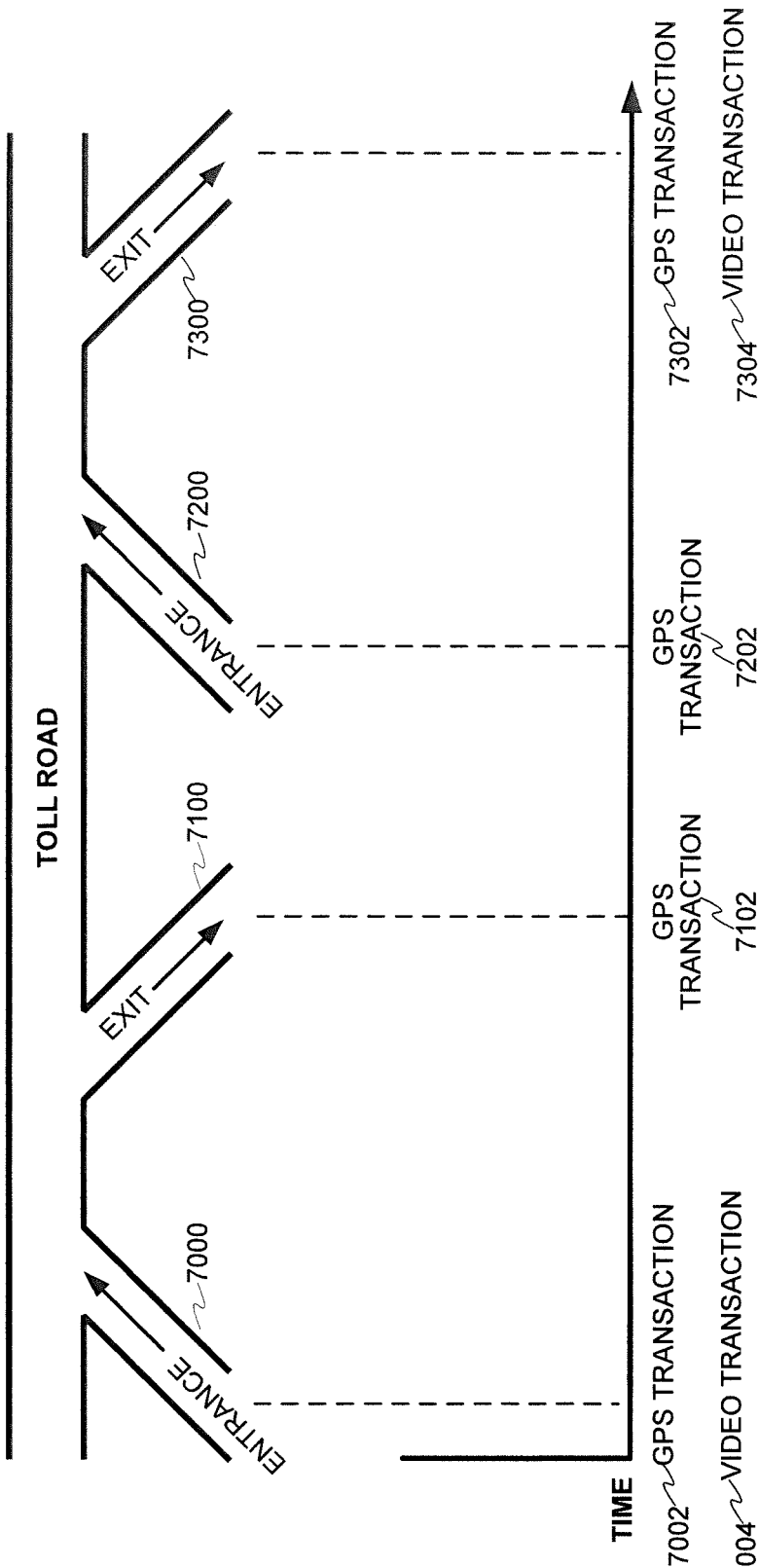
FIG. 7 is an illustration of a toll road and various GPS and video toll transactions relating to the verification and/or reconciliation process illustrated in FIG. 3G.

Referring now to FIG. 3G, therein is illustrated yet another verification and/or reconciliation process. The process of FIG. 3G starts by obtaining the video toll and GPS toll transaction data for a particular transaction at issue (step 3702). Next, at step 3704 a determination is made as to whether the GPS toll transaction data indicates an exit from the toll road followed by an entrance onto the toll road (where there is no corresponding video toll transaction data for both the exit and entrance) occurring in between an entrance onto the toll road and an exit from the toll road, where there is both GPS and video toll transaction data for both these entrance and exit events. This scenario is illustrated in FIG. 7. As shown in FIG. 7, at entrance 7000 there exists both a GPS toll transaction 7002 and a video toll transaction 7004. Next, GPS toll transaction 7102 indicates an exit from the toll road at location 7100 (no corresponding video toll transaction) followed by an entrance onto the toll road at 7200, as indicated by GPS toll transaction 7202 (no corresponding video toll transaction). Further, at a later location and time, both GPS toll transaction 7302 and video toll transaction 7304 indicate an exit from the toll road at the same location 7300. Step 3704 is intended to detect the scenario of FIG. 7, and if this is found to be the case, then the process continues to step 3706 and the intermediate GPS transactions 7102 and 7104 for which there are no corresponding video toll transactions are accepted as valid transaction. Alternatively, if at step 3704, the determination does not indicate the scenario of FIG. 7 has occurred, then the process continues to step 3708 and further verification and/or reconciliation is performed.

Figure 4:
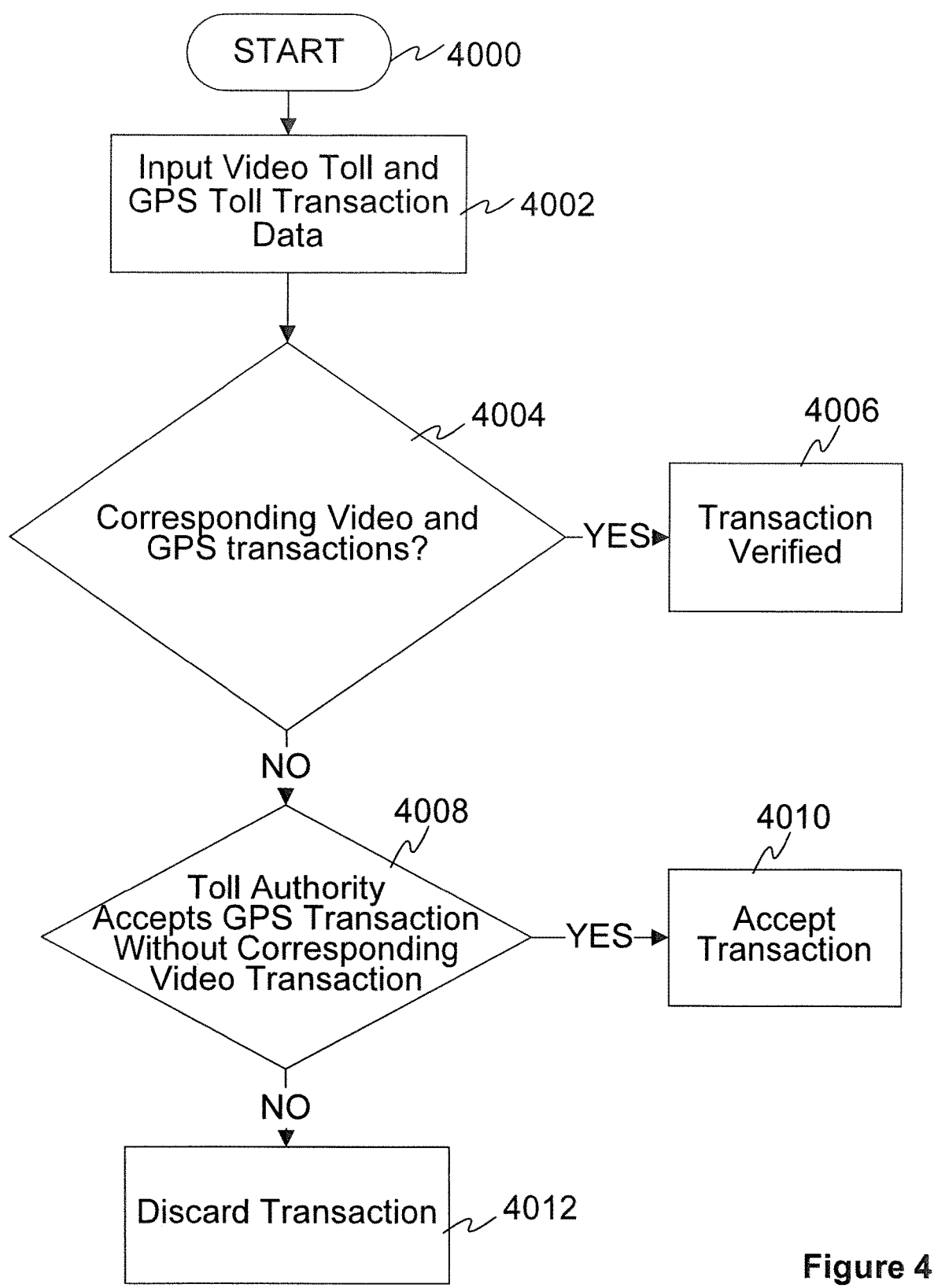
FIG. 4 is a flowchart illustrating a further verification and/or reconciliation process according to an embodiment of the present invention.

Referring now to FIG. 4, therein is illustrated a further verification and/or reconciliation process according to an embodiment of the present invention. The process begins at step 4000 and is then followed by step 4002, where the video toll transaction data and GPS toll transaction data are obtained. Next, at step 4004, the corresponding video and GPS toll transactions are compared, and if they match, then the process continues to step 4006, and the toll transaction is verified, since there is both GPS toll transaction data and matching video toll transaction data confirming the toll transaction event. If there is no match at step 4004, then the process continues to step 4008 and a determination is made as to whether the particular toll authority accepts a GPS transaction where there is no matching video transaction to confirm the GPS transaction. If so, then the process continues to step 4010, and the GPS toll transaction is accepted as a valid transaction. Otherwise, the process continues to step 4012, and the transaction being considered is discarded, since there is no mechanism to verify it.

While embodiments of the present invention have been described herein by way of reference to electronic toll transactions, it should be understood that the teachings of the present invention may be applicable to other types of electronic transactions, not necessarily involving vehicle tolling. Such transactions may include any situation where a fee is to be charged to an individual and the method of identifying the particular individual is achieved by identifying a vehicle associated with the particular individual. For example, in a purchase transaction, an individual may be charged for purchase of an item, simply by driving their vehicle through a predetermined payment zone, and the user's vehicle is identified either by way of roadside equipment and/or a user onboard communication device (e.g., mobile phone) as described herein.

Those skilled in the art will recognize that the present invention has many applications, may be implemented in various manners and, as such is not to be limited by the foregoing embodiments and examples. Any number of the features of the different embodiments described herein may be combined into a single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there has been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

The invention claimed is:

1. A method of verifying electronic toll transaction information, comprising the following steps:
   obtaining GPS toll transaction information corresponding to passage through or near a virtual toll location using a mobile device which is capable of receiving wireless signals from a plurality of satellites and processing the wireless signals to determine a location;
   obtaining photo or video toll transaction information captured using roadside equipment including a vehicle sensor which automatically senses the vehicle and triggers automatic operation of a photo or video camera to capture photo or video of the vehicle;
   analyzing the GPS toll transaction information and the photo or video toll transaction information to provide a determination of accuracy of either the GPS toll transaction information or the photo or video toll transaction information, where the analyzing step comprises the further steps of determining whether the photo or video toll transaction information indicates a later in time exit from a road, where the GPS toll transaction information indicates an earlier in time exit from the road at an earlier location and a deactivation of a GPS toll capability at a time which is earlier than the time associated with the photo or video toll transaction, and when the photo or video toll transaction information indicates such a later in time exit, then indicating the earlier in time GPS toll transaction information as accurate, and optionally indicating the later in time photo or video toll transaction information as inaccurate.

2. The method of claim 1, wherein the analyzing step further comprises the steps of using time and location information associated with the GPS toll transaction information and time and location information associated with the photo or video toll transaction information to determine a possible vehicle speed between the location associated with the GPS toll transaction and the location associated with the photo or video toll transaction, and when the vehicle speed exceeds a predetermined amount, then indicating as inaccurate one or both of the GPS toll transaction and the photo or video toll transaction.

3. The method of claim 1, wherein the analyzing step further comprises the steps of determining that multiple photo or video toll transactions for a single tolling location are received within a predefined time window relative to a time of the GPS toll transaction information, and indicating the GPS toll transaction information as being accurate and indicating the additional ones of the multiple photo or video toll transaction information as being inaccurate.

4. The method of claim 1, wherein the analyzing step further comprises the steps of determining that the photo or video toll transaction information indicates an entrance onto the road prior to activation of the GPS toll capability and prior to a GPS toll transaction being recorded indicating entrance onto the road, and then indicating that the photo or video toll transaction information is inaccurate.

5. A method of verifying electronic toll transaction information, comprising the following steps:
    obtaining GPS toll transaction information corresponding to passage through or near a virtual toll location using a mobile device which is capable of receiving wireless signals from a plurality of satellites and processing the wireless signals to determine a location;
    obtaining photo or video toll transaction information captured using roadside equipment including a vehicle sensor which automatically senses the vehicle and triggers automatic operation of a photo or video camera to capture photo or video of the vehicle;
    analyzing the GPS toll transaction information and the photo or video toll transaction information to provide a determination of accuracy of either the GPS toll transaction information or the photo or video toll transaction information, where the analyzing step comprises the further steps of determining whether the GPS toll transaction information indicates an intermediate exit from a road followed by an intermediate entrance onto the road where there is no corresponding photo or video toll transaction information for both the exit and entrance GPS toll transactions, and further determining whether these exit and entrance GPS toll transactions occur in between an entrance onto the road and an exit from the road where there is both GPS and photo or video toll transaction information, and then indicating the intermediate exit and entrance GPS toll transactions as being accurate.

6. The method of claim 5, wherein the analyzing step further comprises the steps of using time and location information associated with the GPS toll transaction information and time and location information associated with the photo or video toll transaction information to determine a possible vehicle speed between the location associated with the GPS toll transaction and the location associated with the photo or video toll transaction, and when the vehicle speed exceeds a predetermined amount, then indicating as inaccurate one or both of the GPS toll transaction and the photo or video toll transaction.

7. The method of claim 5, wherein the analyzing step further comprises the steps of determining that multiple photo or video toll transactions for a single tolling location are received within a predefined time window relative to a time of the GPS toll transaction information, and indicating the GPS toll transaction information as being accurate and indicating the additional ones of the multiple photo or video toll transaction information as being inaccurate.

8. The method of claim 5, wherein the analyzing step further comprises the steps of determining that the photo or video toll transaction information indicates an entrance onto the road prior to activation of the GPS toll capability and prior to a GPS toll transaction being recorded indicating entrance onto the road, and then indicating that the photo or video toll transaction information is inaccurate.

* * * * *